United States Patent Office 3,366,443
Patented Jan. 30, 1968

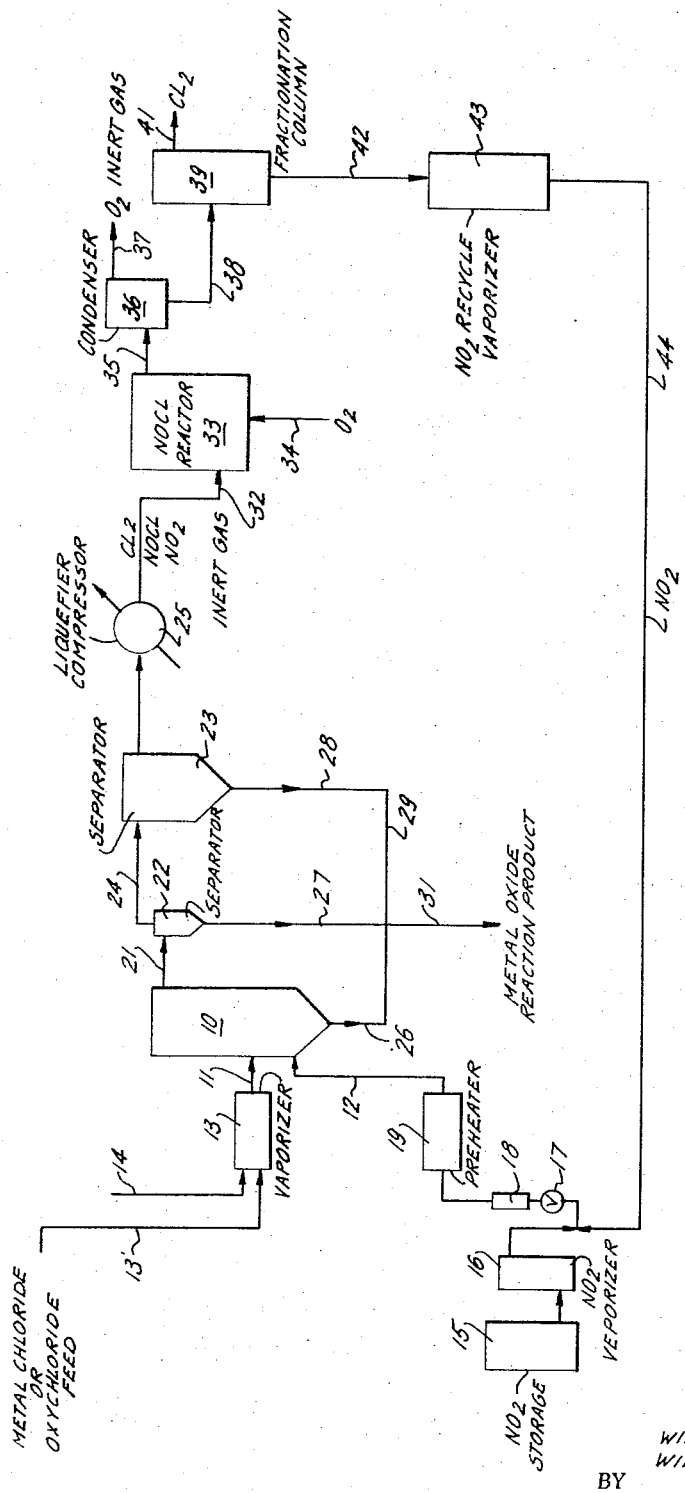

3,366,443
PROCESS OF PRODUCING ULTRA-FINE METAL OXIDES
William B. Lauder and William C. Eichelberger, Syracuse, N.Y., assignors to Allied Chemical Corporation, New York, N.Y., a corporation of New York
Filed Nov. 21, 1963, Ser. No. 325,340
The portion of the term of the patent subsequent to Aug. 2, 1983, has been disclaimed
7 Claims. (Cl. 23—21)

This invention relates to the production of metal oxides and, more particularly, to the production of metal oxides of relatively low bulk density, high surface area, and high reactivity, eminently satisfactory for use in the many fields in which metal oxides are employed, including the production of solid state reaction products of metal oxides with other metals and other metal compounds, including the oxides, carbonates, and other compounds of such other metals.

For the sake of brevity, the expression "composite oxides" is used herein to refer to the reaction products obtained by the solid state reaction of the highly reactive metal oxides embodying this invention with other metals, metal oxides and metal compounds. Such reaction products are sometimes referred to in this field as "complex oxides." Examples of such composite oxides are the alkaline earth metal niobates, such as calcium niobate, useful in the manufacture of electronic components.

Composite oxides are commonly manufactured by reacting a metal oxide with another metal or a compound of such other metal, e.g., an oxide, carbonate, nitrate, sulfate, etc. Metal oxides of the metals molybdenum, tungsten, vanadium and niobium, heretofore available, leave much to be desired from the standpoint of their reactivity, including reactivity in such solid state reactions.

It is a principal object of the present invention to provide a process for producing metal oxides of unique, relatively high reactivity.

It is another object of this invention to provide a process for producing metal oxides of high reactivity, low bulk density and ultra-fine particle size, which process is comparatively simple to carry out and results in the production of the metal oxides in good yields.

Other objects and advantages of the present invention will be apparent from the following description thereof. While reference herein is made to the production of composite oxides from the metal oxides of this invention, it will be understood that the production of such composite oxides is only one field of utility of the highly reactive metal oxides of this invention and these oxides can be used wherever the less reactive corresponding metal oxides have found utility.

In accordance with this invention, the oxides of niobium, vanadium, molybdenum, tungsten and boron are produced in highly reactive, ultra-fine particle size by reacting in the vapor phase under anhydrous conditions at temperatures within the range of from 175° to 500° C. a chloride or oxychloride of the metal, which chloride or oxychloride has an appreciable vapor pressure at temperatures of about 500° C. or lower, with nitrogen dioxide, employing at least the stoichiometric amount of nitrogen dioxide to produce the metal oxide. Surprisingly, under these reaction conditions in the case of the identified chlorides and oxychlorides having an appreciable vapor pressure at about 500° C. or lower, a metal oxide is produced directly of ultra-fine particle size, about micron or sub-micron size, readily separable from the gaseous reaction products, chiefly nitrosyl chloride and chlorine, concurrently produced.

The metal chlorides used can be the commercially available chlorides of the enumerated metals, viz, niobium chloride ($NbCl_5$), also termed "columbium chloride," molybdenum chloride ($MoCl_5$), tungsten chloride ($WCl_6$), boron chloride ($BCl_3$), vanadium tetrachloride ($VCl_4$), all of which have appreciable vapor pressures at temperatures of about 500° C. Vanadium trichloride ($VCl_3$) disproportionates on heating to $VCl_4$ and $VCl_2$, and hence its use results in approximately half the yield of the desired highly reactive oxide when reacted with nitrogen dioxide. While $VCl_3$ can be used, $VCl_4$ is preferred. $VCl_2$ cannot be used.

The molybdenum oxychlorides ($MoO_2Cl_2$, $MoOCl_3$, $Mo_2O_3Cl_5$), vanadium oxychloride ($VOCl_3$), tungsten oxychloride ($WOCl_4$) and niobium oxychloride ($NbOCl_3$)

all have appreciable vapor pressures at temperatures of about 500° C. and can be used.

The reaction temperature employed for conducting the reaction of the different metal chlorides or oxychlorides herein disclosed, for optimum yields, will differ within the range of from 175° to 500° C. for the different metals. For example, the reaction of the niobium chloride with the nitrogen dioxide is best carried out at a temperature within the range of from 350° to 450° C.; in the case of vanadium oxychloride, the preferred temperature range is from 300° to 425° C.; the preferred temperatures for the reaction of molybdenum chloride are within the range of from 300° to 450° C.; for tungsten chloride it is within the range of from 325° to 500° C.; and for boron chloride it is within the range of from 250° to 300° C.

The metal chloride or oxychloride, if impure, particularly if it contains impurities such as would contaminate the metal oxide product, is purified by sublimation or vaporization, and fractional condensation of the vapors to obtain a relatively pure metal chloride. Anhydrous metal chloride or oxychloride vapors from any available source, for example that produced by heating the metal chloride or oxychloride, where heating is necessary, are introduced into the oxidation zone. Certain metal chlorides, such as boron chloride, which boils at 13° C., for example, can be introduced in vapor form at ambient temperatures. The temperature to which those metal chlorides or oxychlorides which require heating are heated depends upon the particular metal chloride or oxychloride employed as well as the pressure conditions under which the heating is carried out. In every case the metal chloride or oxychloride is introduced into the reactor in anhydrous condition. By using a mixture of these metal chlorides or oxychlorides, a mixture of the corresponding metal oxides is produced.

The nitrogen dioxide introduced into the reactor can be $NO_2$, or $N_2O_4$, or mixtures of $NO_2$ and $N_2O_4$. Actually the nitrogen dioxide employed in the reaction is the equilibrium mixture of $NO_2$, $N_2O_4$, $NO$, and $O_2$ prevailing at the reaction temperature. Desirably, the nitrogen dioxide is preheated to reaction temperature before introduction into the reactor. At least the stoichiometric proportions of nitrogen dioxide to form the desired oxide are used. An excess of nitrogen dioxide can be used, say up to about 20% to 40% over and above the stoichiometric amount required for the reaction.

The reaction production thus produced is of ultra-fine particle size, not exceeding about 1 micron, for all of the reaction products except for the molybdenum which has a particle size of about 2 to 6 microns. These products consist substantially entirely of the metal oxide; they may contain small amounts of chloride or free chlorine, usually less than 3% and, in most cases, a fraction of a percent. The small amount of chlorine, whether free or combined, present can be removed by heating the reaction product to a temperature high enough to drive off the chlorine; the temperature to which a given reaction product is heated depends upon the physical constants of that reaction product. In all cases the reaction product should not be heated to a temperature which results in a material increase in the particle size of the product.

Along with the solid reaction product, gaseous products are produced consisting chiefly of nitrosyl chloride and chlorine. These gaseous products can be treated in known manner to oxidize the nitrosyl chloride to produce nitrogen dioxide and chlorine. The chlorine thus produced and that formed in the reaction with the metal chloride or oxychloride is recovered as a valuable by-product. The nitrogen dioxide can be recycled to the oxidizer for reaction with the metal chloride or oxychloride.

The accompanying drawing is a flow sheet, showing diagrammatically one arrangement of equipment for practicing a preferred embodiment of this invention.

Referring to the drawing, the oxidizer reactor 10 is supplied with anhydrous metal chloride or oxychloride vapor and nitrogen dioxide through lines 11 and 12, respectively. Metal chloride or oxychloride is introduced into the vaporizer 13 through line 13'. An inert carrier gas, preferably nitrogen, can be introduced into the vaporizer 13 through line 14, and the resultant mixture of carrier gas and anhydrous metal chloride or oxychloride vapors flow through line 11 into the oxidizer reactor 10. Liquid nitrogen dioxide is supplied from the storage tank 15 to a vaporizer 16 from which the vapors flow through a control valve 17, a flow indicator 18 and thence to the nitrogen dioxide preheater 19 communicating with line 12 leading into reactor 10.

Gaseous reaction products containing entrained reaction product leave the top of reactor 10 through line 21 and enter the cyclone separator 22 where initial separation of reaction product from the gases takes place. From the cyclone separator 22, the gas stream containing residual entrained reaction product flows to the bag separator 23 through line 24. From this bag separator 23, gases consisting chiefly of nitrosyl chloride, chlorine, nitrogen dioxide and inert carrier gas enter the liquefier-compressor 25.

Reaction product is withdrawn from the base of the reactor line 10 through line 26, from the cyclone separator 22 through line 27 and from the bag separator 23 through line 28. These lines lead into manifold 29 provided with a discharge conduit 31 through which the reaction product is discharged for further treatment as hereinabove described.

Liquefier-compressor 25 effects liquefaction of the nitrosyl chloride, chlorine and nitrogen dioxide in the gaseous stream passing therethrough. The resultant mixture of liquid and inert gas flows through line 32 into the nitrosyl chloride reactor 33, which may be of the type disclosed in U.S. Patent 2,297,281, having an oxygen inlet 34 and communicating through line 35 with a condenser or cooler 36. In reactor 33 the nitrosyl chloride is oxidized under a pressure of from 150 to 1500 p.s.i.g. and at a temperature of from 50° to 100° C., as disclosed in U.S. Patent 2,297,281, to produce nitrogen dioxide and chlorine. The reaction products from reactor 33 enter the condenser 36 through line 35 where separation takes place of the oxygen and the inert gas, removed through line 37, from the liquid mixture of chlorine and nitrogen dioxide which flows through line 38 into the fractionating column 39. Here fractionation of this liquid mixture takes place; the chlorine is removed overhead through line 41. The nitrogen dioxide is removed through line 42 and enters the vaporizer 43 where vaporization is effected. The vapors flow through line 44 for recycle through the process.

Reactor 10 may be lined with or built from acid brick, ceramic material, glass, stoneware or glazed steel, provided with a cooler, such as a jacket through which a suitable cooling medium is passed, to maintain the reactor walls at a maximum temperature of 500° C. Other materials of construction resistant to corrosion under the prevailing conditions may, of course, be used. The filter bag in the bag separator 23 desirably is of polyester material, e.g., Dacron, or other filter medium not attacked by the reaction products.

The metal chloride vapor, inert carrier gas mixture leaves the vaporizer 13 and enters the oxidizer 10 at a temperature of from 175° to 500° C., preferably 200° to 300° C. The nitrogen dioxide is preheated in preheater 19 to a temperature approximately the same as the inlet temperature of the metal chloride. The temperature in the reactor 10 is maintained within the range of from 175° to 500° C., the particular temperature within this range employed depending upon the metal chloride or oxychloride reacted. The reactor 10 desirably is jacketed for circulation therethrough of a suitable cooling medium to maintain the desired reaction temperature; the reaction is exothermic and once started requires cooling to maintain the reaction temperature at the desired level.

The following examples are given to illustrate the preferred embodiments of this invention with the understanding that the invention is not limited to these examples. In the examples the temperatures are given in degrees centigrade. All percentages and parts are given on a weight basis.

*Example I.—Niobium oxide*

450 parts of anhydrous niobium chloride ($NbCl_5$) is reacted at 400° with 250 parts of nitrogen dioxide over a period of 1½ hours. 158 parts of niobium oxide is produced. X-ray diffraction pattern shows the product to be substantially entirely crystalline $Nb_2O_5$. Its chloride content is 1.5%.

To demonstrate the improved reactivity of the niobium oxide thus produced the following comparative test is conducted. One part of niobium oxide produced in Example I, after heating at 300° for four hours, is mixed with precipitated chalk by grinding in an agate mortar. Two parts of this mixture is placed on a platinum foil and heated to 927° in 23 minutes and held at this temperature for an additional five minutes.

For comparative purposes a mix of laboratory grade niobium oxide and the same precipitated chalk in the same proportions are heated in exactly the same manner.

Both reaction products thus produced are examined by X-ray diffraction. The reaction product made with the niobium oxide of Example I is found to contain appreciably more calcium niobate than that produced with the commercially available niobium oxide, thus demonstrating the greater reactivity of the niobium oxide made by the process of this invention.

*Example II.—Vanadium oxide*

In this example a nitrogen carrier gas stream preheated to a temperature of 320° is passed through liquid vanadium oxychloride ($VOCl_3$). The resultant stream of carrier gas containing vapors of vanadium oxychloride is introduced into the reactor along with nitrogen dioxide in amounts of 146 parts of vanadium oxychloride and 150 parts of nitrogen dioxide over a period of 1½ hours and reacted at 720°. 30 parts of product, essentially crystalline vanadium oxide ($V_2O_5$), containing 0.2% chlorine is thus obtained.

*Example III.—Molybdenum oxide*

132 parts of molybdenum chloride ($MoCl_5$) is reacted with 90 parts of nitrogen dioxide at 350° during a 40-minute interval. 30 parts of product consisting essentially of crystalline $MoO_3$ containing 0.6% chlorine is thus obtained.

*Example IV.—Tungsten oxide*

78 parts of tungsten chloride ($WCl_6$) in anhydrous vapor condition is reacted with 35 parts of nitrogen dioxide over a period of 1½ hours at 385°. 27 parts of tungsten oxide (WO₃) is thus obtained, essentially crystalline in character, containing 0.2% chlorine.

*Example V.—Boric oxide*

151 parts of gaseous boron chloride ($BCl_3$) is entrained in a nitrogen gas carrier stream, and the resultant mixture introduced into the reactor over a period of 1½ hours. 115 parts of nitrogen dioxide is introduced during this reaction period into the reactor maintained at 300°. 19 parts of boric oxide containing less than 0.2% chlorine is thus produced.

All of the products of the above examples had unusually low bulk density. Electron photomicrographs of all of these products showed them to be in the micron or submicron particle size range. The niobium oxide product of Example I had a bulk density, loose, of 0.283 g./cc. and 0.566 g./cc. when tapped. The particle size of the niobium oxide was within the range of from 0.05 to 0.3 micron. The average particle size was 0.15 micron.

The vanadium oxide product of Example II had a bulk density, loose, of 0.54 g./cc. and tapped 0.99 g./cc.

It will be noted that the present invention provides a process for producing the metal oxides of molybdenum, tungsten, vanadium, boron, and niobium, of high reactivity, low bulk density and ultra-fine particle size. The reaction of oxides or oxychlorides of the enumerated metals with nitrogen dioxide to produce directly an oxide reaction product containing substantially none or relatively small amounts of chloride or chlorine, less than about 3%, at temperatures within the range of from 175° to 500° C., is unique to the oxides and oxychlorides of these metals. Germanium chloride ($GeCl_4$) and silicon chloride ($SiCl_4$), for example, do not react with nitrogen dioxide at temperatures below 500° C. to produce oxides or, for that matter, oxychlorides to any appreciable extent. Reaction of $SiCl_4$ with $NO_2$ has been found to be very slow at 500° C. even in the presence of a nucleating agent such as titanium dioxide.

Since certain changes in carrying out the process above described can be made without departing from the scope of this invention, it is intended that all matter contained in the above description or shown in the accompanying drawing shall be interpreted as illustrative and not in a limiting sense.

What is claimed is:

1. A process which comprises reacting a metal compound from the group consisting of the chlorides and oxychlorides of niobium, molybdenum, tungsten, vanadium and boron, in the vapor phase at a temperature within the range of from 175° to 500° C. with nitrogen dioxide in at least the stoichiometric proportions to produce a solid reaction product in finely divided form consisting essentially of the oxide of the metal, and recovering said solid reaction product.

2. The process which comprises reacting niobium chloride in the vapor phase with at least the stoichiometric amount of nitrogen dioxide to form niobium oxide at a temperature within the range of from 300° to 450° C. to produce crystalline niobium oxide and recovering said niobium oxide.

3. The process of producing vanadium oxide which comprises reacting vanadium oxychloride in the vapor phase with at least the stoichiometric amount of nitrogen dioxide to form vanadium oxide at a temperature within the range of from 300° to 425° C. to produce a solid reaction product consisting essentially of crystalline vanadium oxide, and recovering said reaction product.

4. The process of producing molybdenum oxide which comprises reacting a molybdenum compound from the group consisting of molybdenum chloride and molybdenum oxychloride in the vapor phase with at least the stoichiometric amount of nitrogen dioxide to form molybdenum oxide, at a temperature within the range of from 300° to 450° C. to produce a solid reaction product consisting essentially of crystalline molybdenum oxide, and recovering said reaction product.

5. The process of producing tungsten oxide which comprises reacting tungsten chloride in the vapor phase with at least the stoichiometric amount of nitrogen dioxide to form tungsten oxide at a temperature within the range of from 325° to 500° C. to produce a reaction product consisting essentially of crystalline tungsten oxide, and recovering said reaction product.

6. The process of producing boron oxide which comprises reacting boron chloride in the vapor phase with at least the stoichiometric amount of nitrogen dioxide to form boron oxide, at a temperature within the range of from 250° to 300° C. to produce a solid reaction product consisting essentially of crystalline boron oxide, and recovering said reaction product.

7. The process of producing alkaline earth metal niobates which comprises reacting anhydrous niobium chloride with nitrogen dioxide in at least stoichiometric proportions to produce niobium oxide at a temperature within the range of from 300° to 400° C., isolating the solid reaction product thus produced, mixing the solid reaction product with alkaline earth metal carbonate in approximately stoichiometric proportions to form the alkaline earth metal niobate, heating the mixture to a temperature at which solid state reaction between the alkali metal carbonate and the niobium oxide takes place to produce alkaline earth metal niobate, and recovering the alkaline earth metal niobate.

References Cited

UNITED STATES PATENTS

| | | | |
|---|---|---|---|
| 2,502,347 | 3/1950 | Schaumann | 23—202 |
| 2,635,946 | 4/1953 | Weber et al. | 23—140 |
| 2,653,078 | 9/1953 | Lane | 23—139 |
| 2,758,008 | 8/1956 | Reisman et al. | 23—51 |
| 2,791,490 | 5/1957 | Willcox | 23—139 X |
| 2,823,982 | 2/1958 | Saladin et al. | 23—140 |
| 3,063,797 | 11/1962 | Hildreth | 23—202 X |

MILTON WEISSMAN, *Primary Examiner.*

OSCAR R. VERTIZ, *Examiner.*

H. T. CARTER, *Assistant Examiner.*